United States Patent [19]

Tokumitsu et al.

[11] 4,081,497

[45] Mar. 28, 1978

[54] METHOD FOR PRODUCING A HIGH IMPACT POLYSTYRENE

[75] Inventors: Ichiro Tokumitsu; Hideo Konuma; Shigeaki Mochizuki; Yoshio Okada; Hiroshi Yasumoto; Isao Yoshihiro, all of Tokuyama, Japan

[73] Assignee: Idemitsu Petrochemical Co., Ltd., Tokyo, Japan

[21] Appl. No.: 703,475

[22] Filed: Jul. 8, 1976

[30] Foreign Application Priority Data

Jul. 9, 1975 Japan .................. 50-83531

[51] Int. Cl.² .............. C08L 9/06; C08L 8/06
[52] U.S. Cl. .............. 260/880 R; 260/4 AR; 260/95 C; 526/64
[58] Field of Search ............. 260/880 R, 880 B, 95 C; 526/64

[56] References Cited

U.S. PATENT DOCUMENTS

| 3,052,664 | 9/1962 | Cleland | 526/64 |
|---|---|---|---|
| 3,054,783 | 9/1962 | Lashua | 526/64 |
| 3,451,986 | 6/1969 | Metais | 526/64 |
| 3,595,846 | 7/1971 | Rouzier | 260/95 C |
| 3,679,651 | 7/1972 | Toshimichi | 526/64 |
| 3,980,628 | 9/1976 | Sorenson | 526/64 |

Primary Examiner—Paul R. Michl
Attorney, Agent, or Firm—Fred Philpitt

[57] ABSTRACT

In the method for producing a high impact polystyrene from a monomer of styrene or/and its derivative and a rubbery polymer as reactants, an improvement is provided which comprises passing said reactants through a tubular reactor having parts where the passage way of flow of said reactants is constricted, while keeping said reactants in a laminar flow as much as possible in the parts other than said parts, in a first stage polymerization to prepare a reacted mixture containing a prepolymer until the conversion of monomer to polymer becomes 10 to 60%, and subjecting the resulting reacted mixture to a second stage polymerization in the state where almost no shearing is exerted thereupon.

The shearing during said first stage polymerization can be uniformly carried out.

The resulting product has superior high impact properties.

7 Claims, No Drawings

METHOD FOR PRODUCING A HIGH IMPACT POLYSTYRENE

DESCRIPTION OF THE INVENTION

This invention relates to a method for producing a high impact polystyrene. More particularly, it relates to a method for producing a high impact polystyrene containing a rubbery polymer which comprises passing styrene or/and its derivative and a rubbery polymer as reactants through a tubular reactor having parts where the passage way of flow of said reactants is constricted, while keeping said reactants in a laminar flow as much as possible in the parts other than said parts, in a first stage polymerization to prepare a reacted mixture containing a prepolymer until the conversion of monomer to polymer becomes 10 to 60%, and subjecting the resulting reacted mixture to a second stage polymerization in the state where almost no shearing is exerted thereupon.

Heretofore there has been employed for producing a high impact polystyrene, a method in which styrene and a rubbery polymer are subjected to graft-copolymerization. Particularly, for producing polystyrene having superior impact properties, there are known a method disclosed in Japanese patent publication No. 17062/1964, etc. among those in which shearing condition of reactants during the steps of polymerization is taken into consideration. In the production of high impact polystyrene, the rubbery polymer exists as a continuous phase but it deposits in the reactants with the progress of polymerization. By shearing of the reactants, the rubber phase is particulated and changed into a dispersed phase. Such a phenomenon of phase inversion occurs at a fairly early stage of polymerization but the shearing condition which causes this phenomenon becomes an important factor which determines the shape of dispersed particles of rubber phase. Since the shape of dispersed particles controls directly the impact properties and gloss of products, the shearing condition during the time of phase inversion greatly controls the properties of products. For the above mentioned reason, it is necessary that the shearing for causing the phase inversion is carried out uniformly throughout the reactants. However it has been difficult for any of stirred vessels equipped with various type blades such as paddle-type, anchor-type, helical ribbon-type or the like to provide uniform shear. In addition these stirred vessels are not satisfactory yet from the problem of polymerization reaction such as heat removal, residence time distribution in continuous operation.

After comprehensive studies on the effective methods for uniform shearing during the steps of production of high impact polystyrene, we have found a following method. According to this method, in the production of high impact polystyrene usually having a composition of 80 to 99 parts by weight of monomeric units of styrene or/and a styrene derivative and one to 20 parts by weight of a rubbery polymer, polymerization is carried out by passing the reactants through a tubular reactor having parts where the passage way of flow of reactants is constricted, while keeping said reactants in a laminar flow as much as possible in the parts other than said parts, until the conversion of monomer to polymer becomes 10 to 60%. Accordingly, preferable shearing is carried out during this stage and ideal dispersion of particles of rubber phase is attained and phase inversion is carried out. Subsequently polymerization is advanced in the state almost free of shearing of the reactants to obtain polymer products having superior high impact properties.

The reason for the arrangement taken to cause the reactants to flow in a laminar state as much as possible in the parts other than the constricted parts is mainly for making the properties of products uniform by narrowing the width of the distribution of residence time of the reactants in the reactor.

The tubular reactors used in the method of the present invention have a sufficient length in comparison with tube diameter and several parts where the passage way of flow of reactants is constricted by way of orifices, valves, static mixer, packed zone or the like. Since an adequate pressure drop is attained at each of the constricted parts, the reactants undergo a definite shearing hysteresis. Particularly in the section of the tubular reactor where reactants are in the stage of conversion of monomer to polymer in which the phase inversion occurs between rubber phase and polystyrene phase, at least one part where the passage way of flow of reactants is constricted is provided and pressure drop of 1.5 Kg/cm$^2$ or higher, preferably of 5 Kg/cm$^2$ to 15 Kg/cm$^2$ is caused to occur at each one part. The shearing condition at the constricted parts gives a large influence upon the dispersed particles of rubber phase.

Since shear occurs within a very short period of time at the place of a definite conversion of monomer to polymer where phase inversion occurs in the tubular reactor of the present invention, power spent in the unnecessary macroscopical mixing is extremely small unlike in case of conventional reactors. Further in view of apparatus, in the reactor of the present invention, no sealing mechanism is necessary for revolving parts compared with conventional vessel-type reactors. Furthermore in view of polymerization reaction, advantages can be recognized in the points of easiness of operation for heat transfer and uniformity of quality due to narrow residence time distribution.

The prepolymer obtained from the tubular reactor of the present invention is subsequently subjected to a known suspension polymerization process or bulk polymerization process to increase the conversion of monomer to polymer and complete the polymerization with such a precaution that shear is reduced as much as possible.

The conversion of monomer of styrene or a styrene derivative to polymer at which phase inversion occurs, varies depending on the kind and the concentration of rubbery polymer in the raw materials, the ratio of grafted rubbery polymer in products or the like, but, in the range of rubber concentration where increase of impact properties can be expected, the conversion is generally 5 to 20%. However, if the tubular reactor of the present invention is still yet used even after the conversion of monomer to polymer has exceeded 60%, unnecessary dispersion and agglomeration of dispersed particles of rubber phase due to excessive shear, non-uniformity of internal structure of dispersed particles and further breakage thereof are brought about. This becomes a cause of reduction in the impact properties of the products. Accordingly, it is necessary that the conversion of monomer to polymer obtained from the tubular reactor of the present invention is in the range of 10 to 60%, preferably 20 to 40%.

Monomers of styrene or styrene derivatives employed in the present invention include styrene, halogenated styrenes, alkyl styrenes and mixtures of the foregoing monomers. Rubbery polymers include polybutadiene rubber, styrene-butadiene rubber, natural rubber and mixtures of the foregoing members. If necessary, to these raw materials, an internal lubricant and a polymerization modifier may often be added and further an aromatic hydrocarbon or aliphatic hydrocarbon often may be added in an amount up to about 30%.

The high impact properties of polystyrene obtained according to the polymerization method of the present invention is extremely uniform in the dispersion form of rubbery polymer in the polymer and the internal structure thereof. The polystyrene shows not only superior high impact properties but also is superior in such physical properties as tensile strength, heat distortion temperature or the like, and in this regard, its commercial value as commodities is very great.

The present invention will be illustrated by way of non-limitative specific examples and comparative examples more fully.

EXAMPLE 1 – 7

A stainless steel tube having an inner diameter of 6 mm and a length of 28 m was used as a reactor, and ¼ inch needle valves were accommodated in every 4 m throughout the total length. The whole reactor was maintained at a temperature of 140° C with an oil bath, and as raw materials, a solution consisting of 6 parts by weight of polybutadiene (poly-1,4-butadiene, 1,4 cis: 32%, 1,4 trans: 54%, Mooney viscosity, $ML_{1+14}(100°\,C)$: 35) and 94 parts by weight of styrene was continuously fed into the reactor at a rate of 380 cc per hour. The accommodated needle valves were so regulated that 4 valves among them in the upper stream and others might give each a pressure drop of 8 Kg/cm$^2$ and each a pressure drop of 1 to 3 Kg/cm$^2$, respectively.

From nozzles provided midway in the reactor for sampling, prepolymers having different degrees of polymerization were taken out and subjected to suspension polymerization to give beads which were subjected to injection molding and measurement of impact strength. The results are shown in Table 1.

The conditions for the above-mentioned suspension polymerization were as follows: To 5 Kg of prepolymer, 5 Kg of water containing 0.2% by weight of polyvinyl alcohol, 10 g of benzoyl peroxide and 8 g of tertiary butyl peroxybenzoate were added and the resulting mixture was subjected to suspension polymerization in a stirred vessel equipped with three retreated blades. Temperature was elevated at a rate of 30° C per hour, held at 80° C for 1 hour and then elevated again at a rate of 30° C per hour, and polymerization was carried out at 132° C for 5 hours. After completion of polymerization, the resultant beads were washed with water and dried.

Table 1

| Examples | Conversion of monomer to polymer (%) | Izod impact strength (ft.lb./in) | Fish eyes (number/ 100 cm$^2$) |
| --- | --- | --- | --- |
| 1 | 8 | less than 1 | numberless |
| 2 | 10 | 1.8 | 19 |
| 3 | 19 | 2.9 | 7 – 12 |
| 4 | 25 | 3.1 | 7 – 10 |
| 5 | 40 | 3.0 | 5 – 8 |
| 6 | 60 | 2.6 | 4 – 7 |

Table 1-continued

| Examples | Conversion of monomer to polymer (%) | Izod impact strength (ft.lb./in) | Fish eyes (number/ 100 cm$^2$) |
| --- | --- | --- | --- |
| 7 | 67 | 1.6 | 4 – 7 |

COMPARATIVE EXAMPLE 1

From the reactor used for the production of prepolymers in the above-mentioned examples, needle valves used as the parts where the passage way of flow of reactants is constricted were removed, and polymerization was carried out at the same conditions as those of the above Examples in other points. Products obtained were all extremely poor in impact properties and other physical properties and not worthy of evaluation.

COMPARATIVE EXAMPLE 2

Into a stirred vessel equipped with double ribbon blades and having a volume of 1 l, the same raw materials as those of the above Examples were fed at a rate of 550 cc per hour. A prepolymer having a conversion of monomer to polymer, of 36% was obtained at a polymerization temperature of 140° C. Resultant prepolymer was subjected to suspension polymerization under the same conditions as those of the above Examples, and tests of products for physical properties were carried out. The izod impact strength was 1.6 ft.lb./in, and the fish eyes were 12 – 15/100 cm$^2$.

What is claimed is:

1. A method for producing a high-impact polystyrene from reactants that include
   (I) at least one monomer selected from the group consisting of styrene, halogenated styrenes and alkyl styrenes, and
   (II) a rubbery polymer,
the improvement which comprises
   (a) in a first stage passing said reactants into a tubular reaction zone,
      (1) constricting the flow of said reactants in at least one portion of said tubular reaction zone so as to create shearing conditions in each such portion while maintaining laminar flow as much as possible in the unconstricted remainder of said tubular reaction zone, and
      (2) forming a prepolymer in said first stage by converting 10 – 60% of the monomers to polymers in said tubular reaction zone,
   (b) in a second stage completing the polymerization of the reaction mixture resulting from said first stage in a polymerization zone wherein there is essentially no shearing.

2. A method according to claim 1, wherein the prepolymer is formed by converting 20 – 40% of the monomers to polymers in said tubular reaction zone.

3. The method of claim 1 wherein each of said constricted portions provides a pressure drop of at least 1.5 Kg/cm$^2$ to the reactants passing through said first stage.

4. The method of claim 1 wherein constriction is effected with valves.

5. The method of claim 1 wherein constriction is effected by means of orifices.

6. The method of claim 1 wherein constriction is effected with static mixers.

7. The method of claim 1 wherein constriction is effected by means of packed zones.

* * * * *